Jan. 25, 1944.  C. F. SUDMAN  2,340,278
SPONGE RUBBER MOLD
Filed Oct. 3, 1940
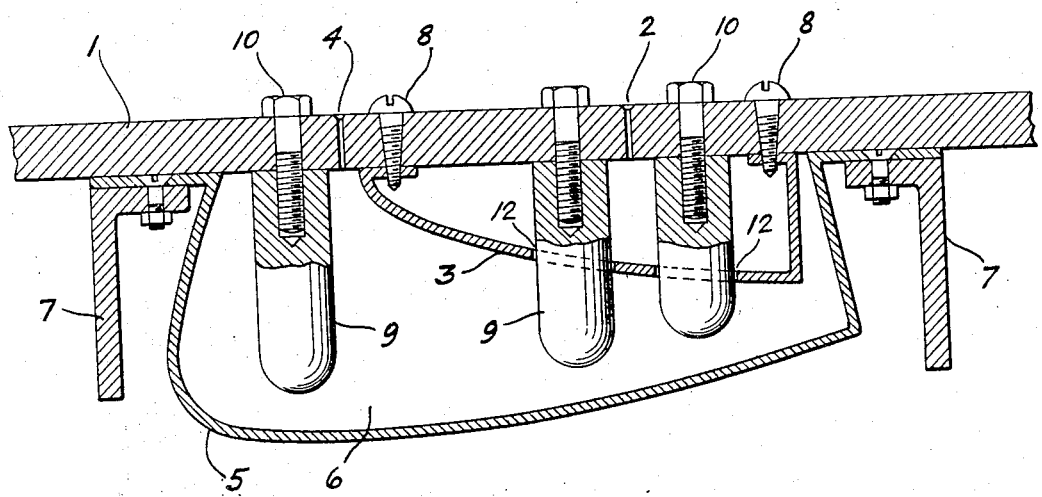
Inventor
Charles F. Sudman Patented Jan. 25, 1944

2,340,278

UNITED STATES PATENT OFFICE 2,340,278

SPONGE RUBBER MOLD

Charles F. Sudman, Akron, Ohio, assignor to Wingfoot Corporation, Akron, Ohio, a corporation of Delaware Application October 3, 1940, Serial No. 359,538

2 Claims. (Cl. 18—34)

This invention relates to a new type of mold for sponge rubber. It includes a mold with an insert and also provides a new means for venting entrapped air from a sponge rubber mold.

It is well known in the art that sponge rubber cushions, mattresses etc. are formed in molds containing lugs which reduce the amount of sponge rubber required and give added softness to the sponge rubber product. These lugs are ordinarily bolted to the mold cover as will be seen more clearly by referring to the drawing. The invention includes a mold with an insert which excludes the foamed latex from around a part of the lugs fastened to the cover of the mold, and it also includes a new design of mold which avoids the necessity of providing the usual vent holes in the mold cover.

The vent holes have been considered necessary, although their use involves various disadvantages. It has been customary to cause the foamed latex to exude through these vent holes and form what are known as pips. In removing the sponge rubber from the molds the pips often are held by the mold cover and cause the rubber to tear, leaving an uneven surface. Furthermore, the loss of rubber in the formation of the pips has in the past amounted to as much as 5% of the total latex employed. The elimination of these pips as provided in the present invention therefore is a decided advance in the art.

The invention will be further described in connection with the accompanying drawing which is an elevation in section through a cushion mold, although, of course, the invention is not limited to cushion molds. The mold cover 1 is of the usual type and is provided with one or more vent holes 2 within the space included by the insert plate 3 and also vent holes 4 outside of this area which perform their usual function. The bottom of the mold 5 which forms the smooth surfaced top of the cushion 6 is supported by the usual angle bowl supports 7.

In order to reduce the amount of latex required for the formation of the sponge rubber cushion the sheet metal insert 3 is inserted as shown to form a cup-shaped hollow in the bottom of the cushion. This insert is fastened to the cover 1 by self-tapping screws 8.

The mold is provided with the usual lugs 9 which are fastened to the cover by the cap screws 10. Instead of providing special short lugs to be fastened to the insert plate 3, lugs of the usual size 9 (which are not necessarily all of the same length) are used and openings 12 are provided in the insert through which the lugs 9 project into the foamed latex.

To use this mold the bowl 5 is filled with the required amount of foamed latex, which may be produced by any of the usual methods. The cover is then placed over the bowl as shown. No closing means are necessary. The weight of the cover is sufficient to keep the bowl closed. Dowels or other pins may be used to prevent lateral displacement.

The openings 12 in the insert plate 3 around the lugs 9 provide a clearance sufficient to permit the escape of entrapped air as the cover is brought into place, but too small for the passage of the foamed latex. A clearance of about .002 to around .005 inch will usually be suitable, although the maximum permissible will depend upon the consistency of the foamed latex. These openings 12 around the lugs therefore provide for venting the air without the formation of pips. The openings, being around the lugs, are in the best possible location for the removal of entrapped air, because apparently the air rises along the surfaces of the lugs and is therefore readily vented through these openings. No vent holes of the usual type are required in the insert 3. To provide for the removal of air from within the hollow formed above the insert, one or more vent holes 2 are provided in the cover plate. The vent holes 4 outside of the area included within the insert 3 vent the air in the usual fashion.

The design of the mold may be improved and the vents 4 may be eliminated by providing a vent hole around each of the lugs 9 which are located outside of that portion of the cover enclosed by the insert 3. Each of these openings may be similar to the openings 12 around the lugs surrounded by the insert 3. The openings should provide a clearance sufficiently small to prevent the passage of the latex therethrough. The maximum clearance permissible will depend upon the thickness of the latex. In general the clearance should be no greater than about 0.005 inch. To accomplish this the lug 9 may be inserted through the cover plate instead of being fastened to it by a cap screw, and the opening in the cover plate may be a few thousandths of an inch larger in diameter than the diameter of the lug. The lug may be held in this opening in any suitable manner to provide for venting the air around the lug through an opening which is too small for the escape of foamed latex.

Applying the same principle of venting to the ordinary mold (i. e., a mold without the insert 3), it will be seen that the usual vent holes may be omitted entirely, and the lugs may be inserted through the cover plate or otherwise fastened to it in such a way as to provide a narrow air-venting passage which is not wide enough to permit the passage of the latex.

The mold is provided with the usual register to make sure that the necessary amount of foamed latex is added to it.

What I claim is:

1. In a mold for sponge rubber, a cover, an insert plate fastened to the cover of the mold adapted to form a hollow in the bottom of the sponge rubber product formed in the mold, a lug fastened to the mold cover and an opening in the insert through which the lug projects with a clearance adequate for the venting of air but too small to permit passage of the foamed latex therethrough.

2. In a mold for sponge rubber, a cover, an insert plate fastened to the cover of the mold adapted to form a hollow in the bottom of the sponge rubber product formed in the mold, and lugs fastened to the cover of the mold and passing through openings provided therefor in the insert.

CHARLES F. SUDMAN.